Dec. 3, 1940.  R. T. GENTRY  2,223,931
MEANS FOR GRINDING GRAIN
Filed Dec. 9, 1937  6 Sheets-Sheet 1
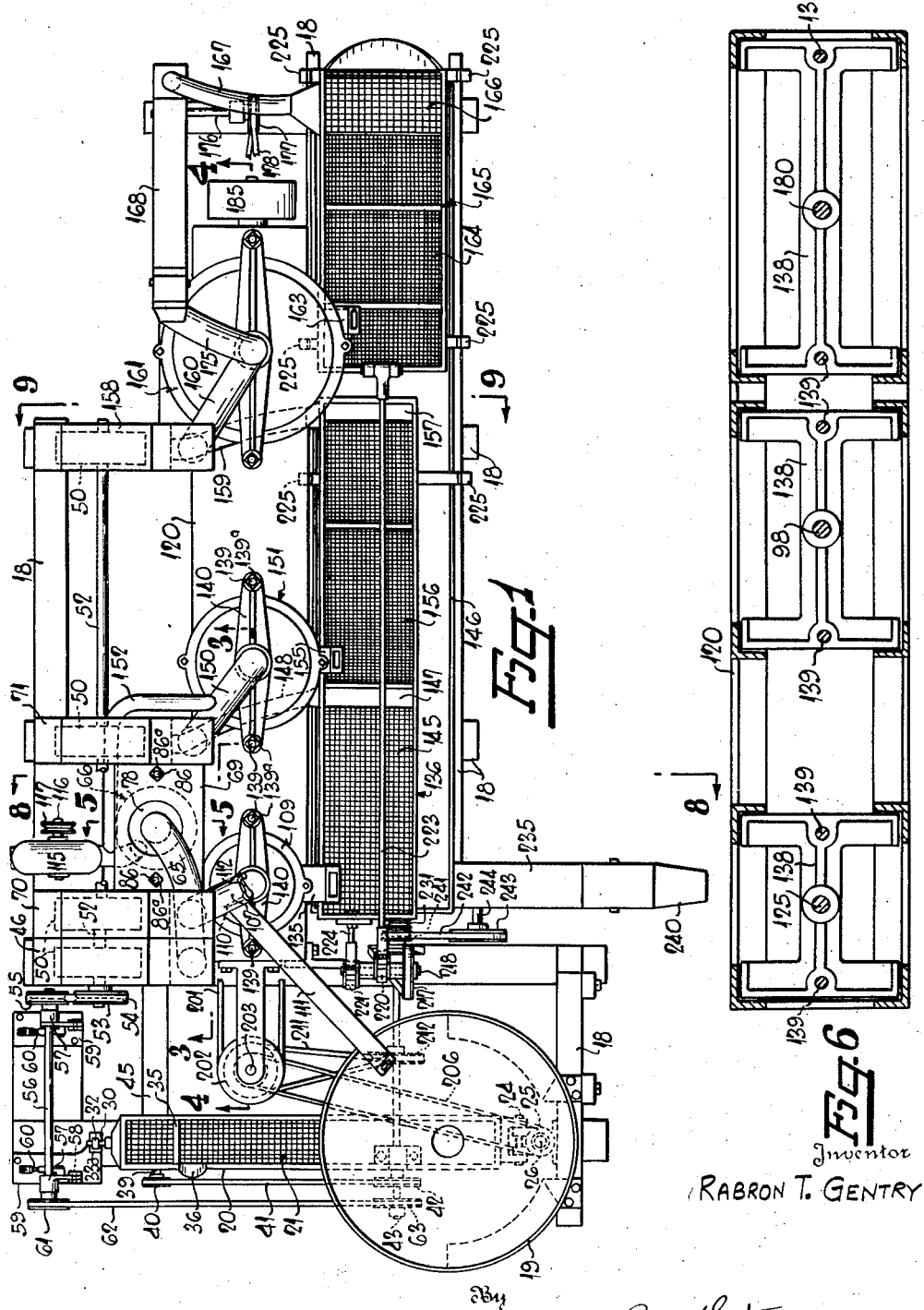
Inventor
RABRON T. GENTRY

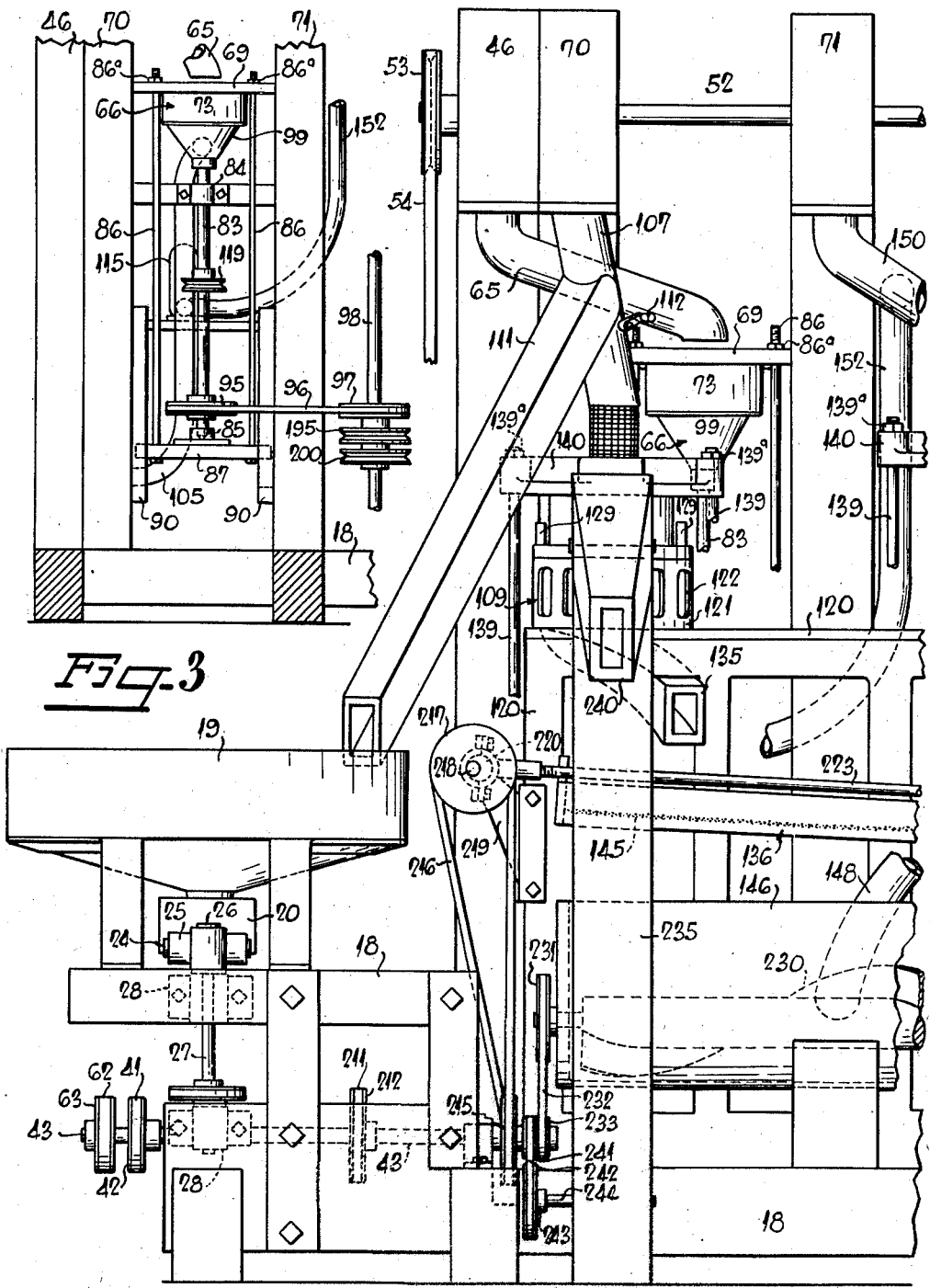

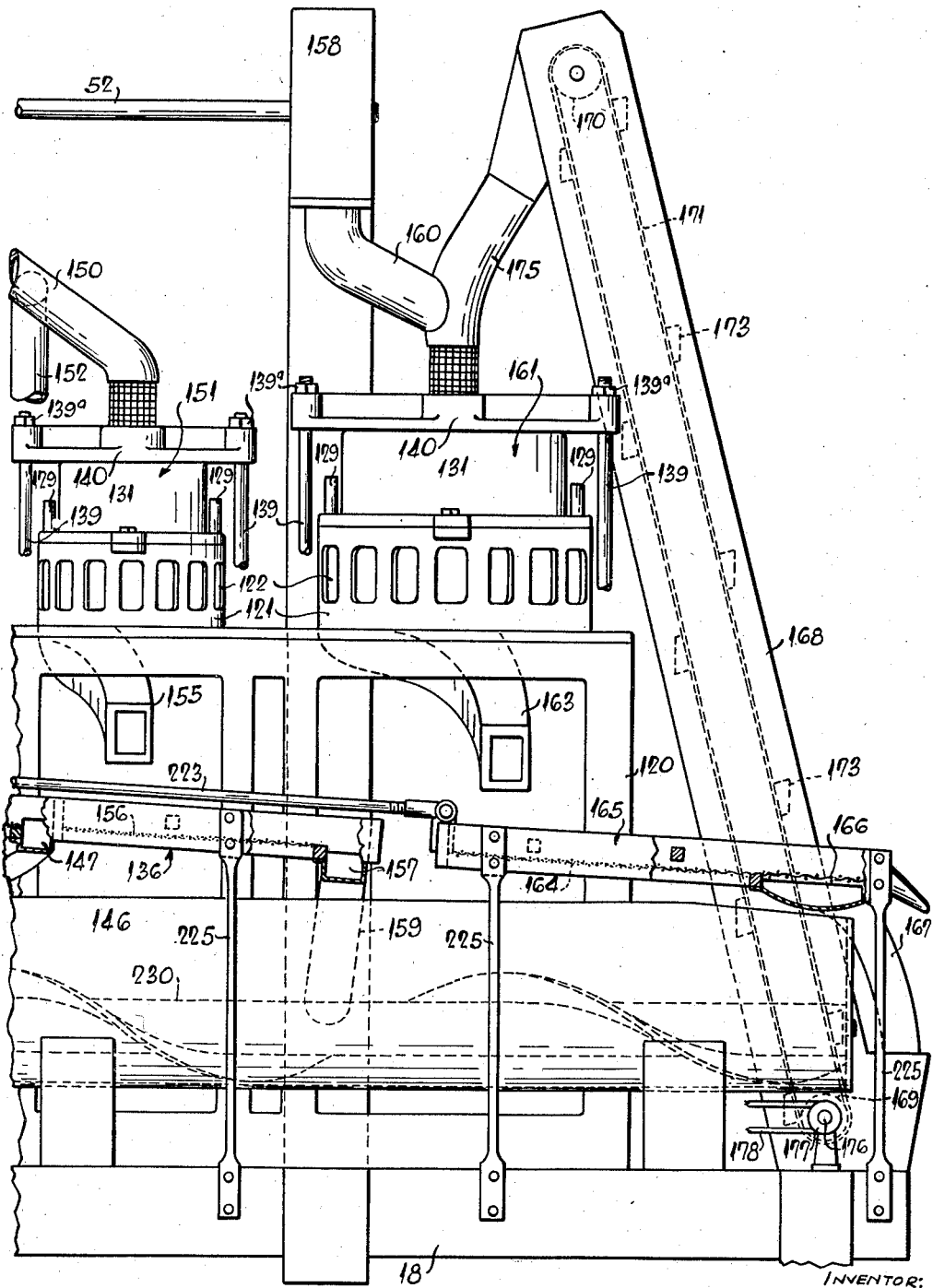

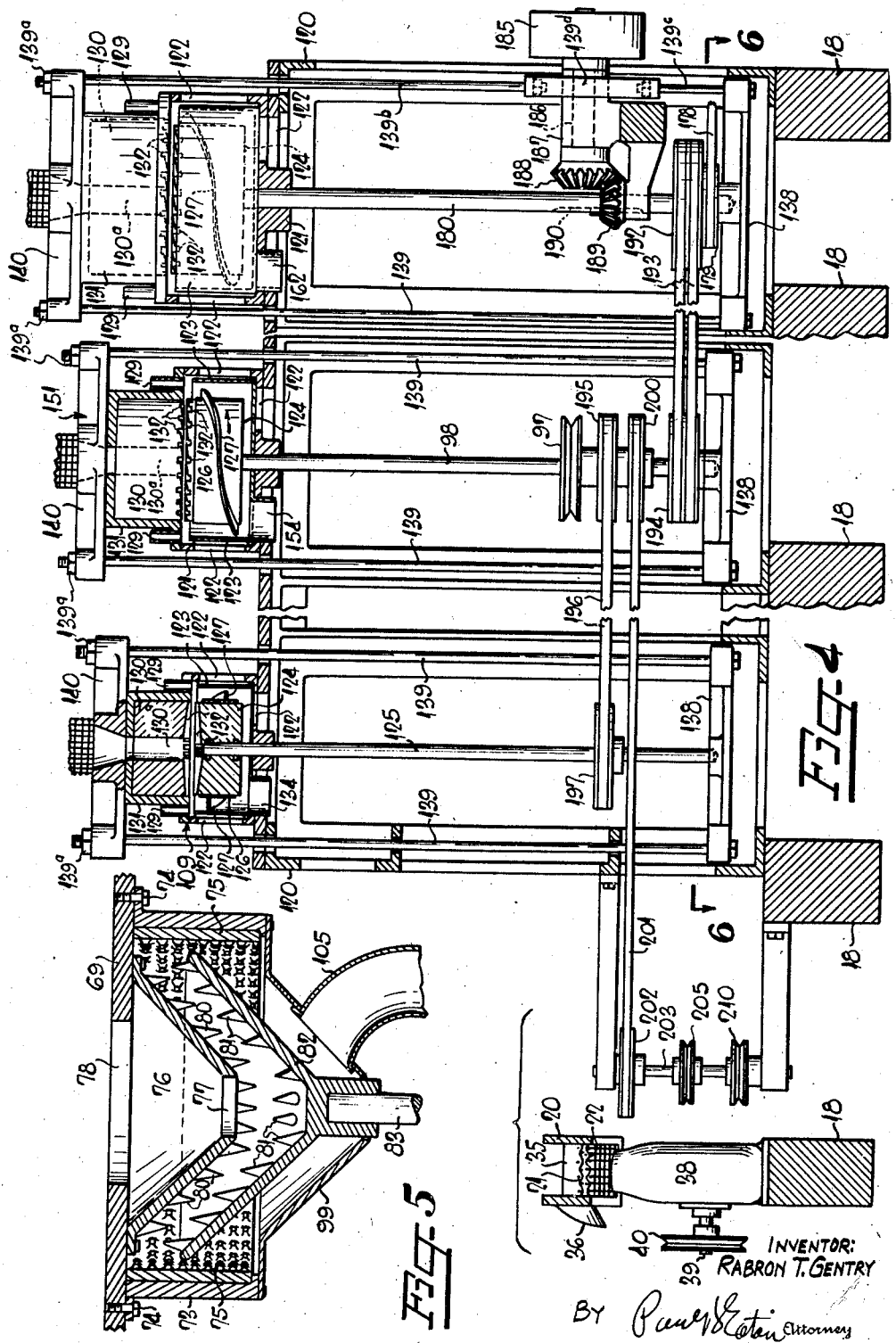

Dec. 3, 1940.  R. T. GENTRY  2,223,931
MEANS FOR GRINDING GRAIN
Filed Dec. 9, 1937   6 Sheets-Sheet 5

Inventor:
RABRON T. GENTRY

Dec. 3, 1940. R. T. GENTRY 2,223,931
MEANS FOR GRINDING GRAIN
Filed Dec. 9, 1937 6 Sheets-Sheet 6
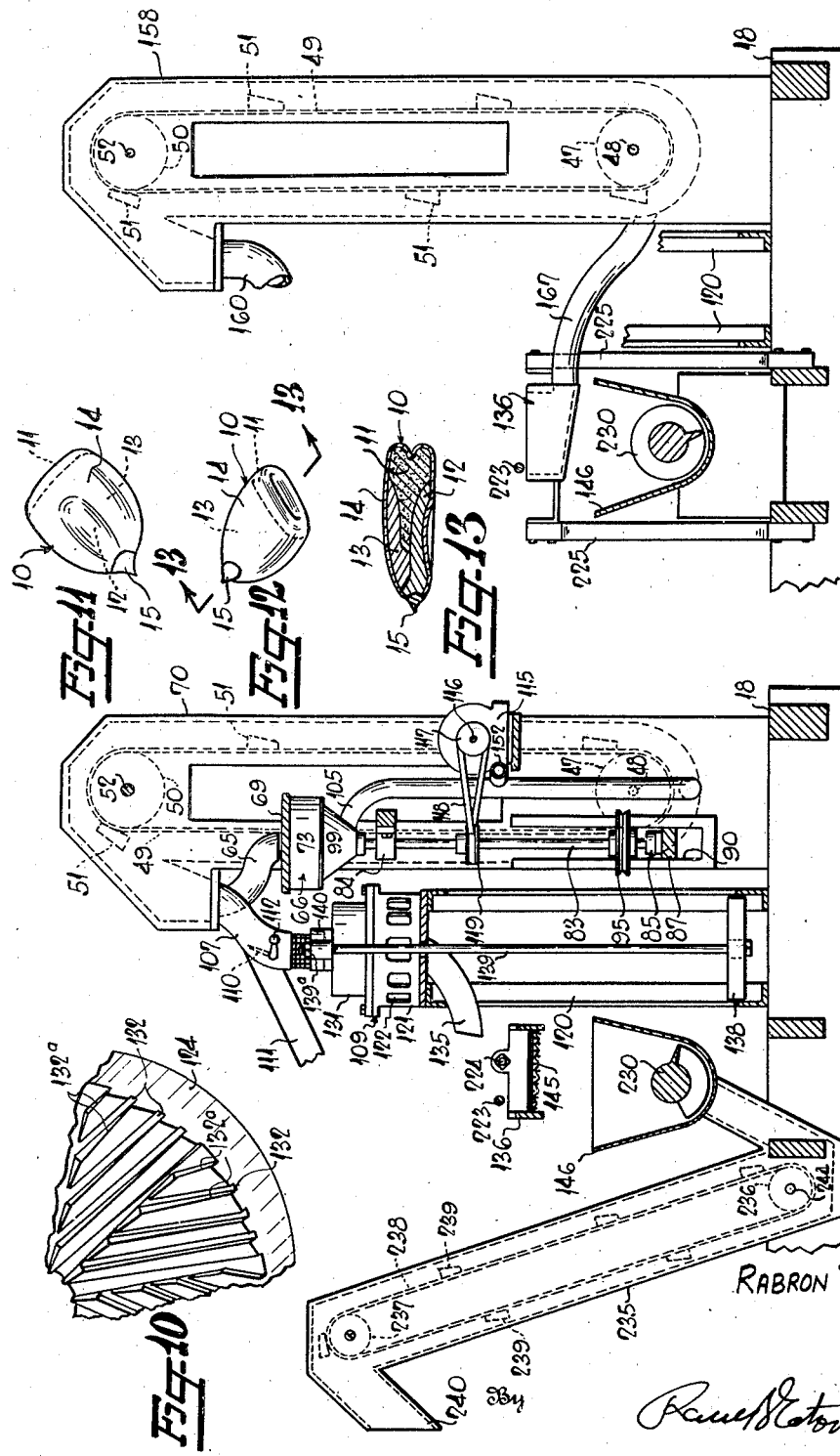
Inventor:
RABRON T. GENTRY
By
Attorney Patented Dec. 3, 1940

2,223,931

UNITED STATES PATENT OFFICE 2,223,931

MEANS FOR GRINDING GRAIN

Rabron T. Gentry, Winston-Salem, N. C.

Application December 9, 1937, Serial No. 178,971

1 Claim. (Cl. 83—93)

This invention relates to a grain grinding apparatus and more especially to a method and means for grinding various portions of a grain according to its hardness and toughness. A grain of corn, for example, is comprised of essentially three parts, that is, a powdered head portion, a hard flinty body portion, and an oily and tough kernel. The powdered head portion contains a starchy substance, comprised of globules which have certain yeast qualities when the ground grain is made into bread. A very small amount of grinding is required for this powdered head portion. If the powdered portion is ground until the remaining flinty and tough portions of the grain are properly ground, the powdered portion would be damaged and consequently when the bread is made from such meal, the desired fluffiness will not be present.

Furthermore, the tough kernel of some grains does not require as much grinding as the hard portion, and if this portion is submitted to the same grinding operation as the flinty portion, its qualities will be damaged, resulting in a defective meal.

Therefore, it is an object of this invention to provide a grain grinding apparatus which is capable of grinding each element of a grain according to its hardness and toughness. By providing such an apparatus, a meal of a uniform grade is obtained without disturbing any of the valuable cooking properties therein.

It is a further object of this invention to provide a method and means for grinding grain comprising first subjecting the grain to a draft of air to remove loose particles therefrom, then scouring or scarifying the exterior surface of said grain to loosen any foreign substances, then subjecting the scoured grain to a second draft of air to remove these particles from the grain, after which each portion of the grain is ground according to its hardness and toughness.

In order to properly grind each element according to its hardness and toughness, it is necessary to employ three mills, one for each element. These mills are driven in unison and connected up in series so that the second mill will grind that portion of the grain not properly ground by the first mill, and the third mill will grind that portion of the grain not properly ground by the second mill. The combined output of all three of the mills is deposited into a single conveyor trough which delivers it to a single outlet.

In conventional corn mills where only one set of stones is used, which grind all of the elements of a grain of corn in one operation, there is from eight to ten pounds of bran for every bushel of corn. By using the improved method, the bran content has been reduced to one and one-half to two and one-half pounds per bushel. Therefore, it is seen that I have provided a method and apparatus which will almost completely remove all of the edible quantities from the bran leaving only the skin or hull. In other words, about ten per cent more meal is obtained by using my apparatus and method.

Some of the objects of the invention, having been stated, other objects will appear as the description proceeds when taken in connection with the accompanying drawings, in which:

Figure 1 is a plan view of my invention;

Figure 2 is a front elevation of the left hand portion of Figure 1;

Figure 2A is a front elevation of the right hand portion of Figure 1;

Figure 3 is a vertical sectional view taken through a lower portion of the mill, along the line 3—3 in Figure 1;

Figure 4 is an enlarged longitudinal vertical sectional view, with portions thereof broken away, and taken along the line 4—4 in Figure 1;

Figure 5 is an enlarged transverse sectional view through the scouring device and taken along the line 5—5 in Figure 1;

Figure 6 is a sectional plan view taken along the line 6—6 in Figure 4 showing the means for supporting the lower end of the grinding stone shafts of the mills employed in this invention;

Figure 8 is a transverse vertical sectional view taken along the lines 8—8 in Figure 1;

Figure 9 is a transverse vertical sectional view taken along the line 9—9 in Figure 1;

Figure 10 is a perspective view showing the portion of the grinding faces of the bottom mill stones;

Figure 11 is an isometric view, showing one side of a grain of corn;

Figure 12 is an isometric view showing the opposite side from that shown in Figure 11;

Figure 13 is a sectional view taken along the line 13—13 in Figure 12.

Figure 7:
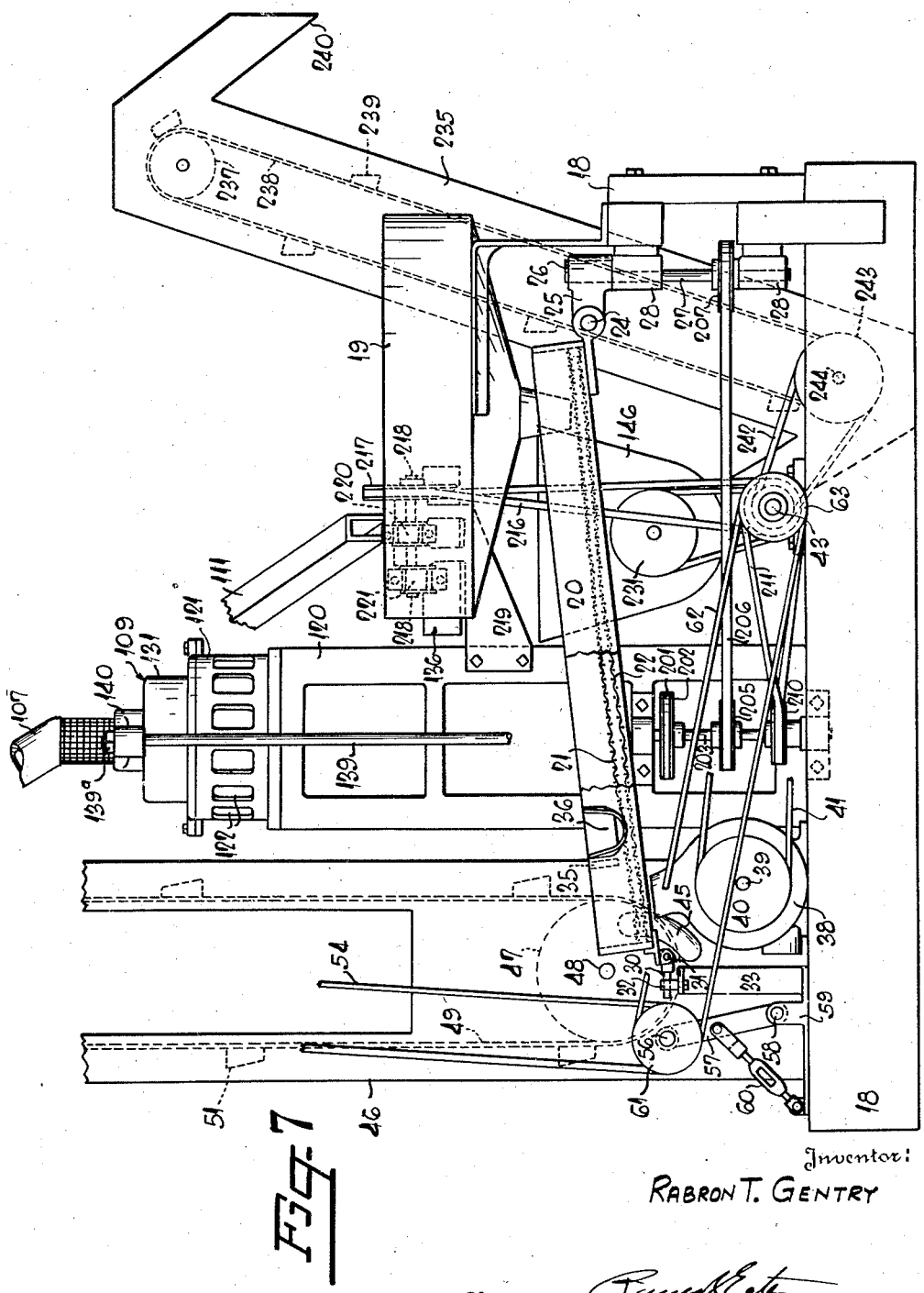
Figure 7 is an elevation looking at the left hand side of Figure 1.

Referring more specifically to the drawings, the numeral 10 denotes a grain of corn (Figures 11, 12 and 13) which comprises a powdered head portion 11, a tough kernel portion 12 and a hard flinty portion 13. An outside skin or husk 14 surrounds all three of these portions and this skin merges into a root 15 which is embedded in a cob during the growth of the corn. The portion 11 comprises a plurality of powdered globules and when subjected to moisture and heat, they will expand and furnish certain yeast qualities to the bread. A very slight amount of grinding will suffice this portion, because the powdered elements are very porous. The tough oily portion 12 requires considerably more grinding in order to properly fit it for bread, and finally the hard flinty portion requires more grinding than either the portion 11 or the portion 12.

Heretofore, it has been the practice in grain mills, especially corn mills, to grind all three of these parts in one operation. As a result, the powdered portion 11 is ground far too much and the globules therein are broken. The yeast or rising qualities of the bread are thereby greatly damaged. Furthermore, if the entire grain is ground sufficiently to give the flinty portion 13 its proper fineness, the tough kernel portion 12 is ground too much.

It is, therefore, seen that there is a great necessity for providing an apparatus which will grind these individual portions the proper amount, and no more. I have provided an apparatus which will first grind the powdered portion 11, then the tough oily kernel portion 12 and finally the hard flinty portion 13. In other words, the portion which is most easily ground is first processed, then the next portion of a greater degree of toughness, and finally the hardest portion.

In the drawings, the numeral 18 designates the framework which supports my grinding apparatus. Upon this framework a suitable hopper 19 is mounted in which the grain such as shown in Figures 11, 12 and 13 is placed after it has been shelled from the cob. Disposed beneath this hopper is a reciprocating screen box 20 which has suitable wire mesh fabrics or perforated members 21 and 22 in the lower portion thereof and over which the grain is passed, in order to allow certain loose impurities and foreign matter to fall therefrom. This screen box 20 has its upper end pivotally secured as at 24 to an arm 25, said arm being mounted around eccentric head portion 26 of a vertically disposed shaft 27 (Figures 1, 2 and 7). This shaft is rotatably mounted in bearings 28, which, in turn, are secured to the framework 18. The lower end of the screen box or sifter 20 has a suitable pin 30 pivotally secured thereto as at 31. This pin is mounted for horizontal sliding movement in the upper portion of bearing 32, said bearing 32 being rotatably mounted in the upper portion of the upright 33.

As the shaft 27 is turned it is seen that the eccentric 26 will cause the screen box 20 and its associated parts to reciprocate and thus cause the grain to move downwardly and over the screens 21 and 22, so that the loose impurities which are mixed with the grain will be allowed to fall through the screen. Also since the member 30 is pivoted as at 31, and the bearing 32 is pivoted so as to have rotative movement about its vertical axis, a limited universal movement of the screen box 20 can be had about the bearing 32 as the eccentric 26 operates the same.

Disposed in the box 20 and near the lower end thereof is a partition 35, the lower end of which is disposed slightly above the top of wire mesh 21. Near this point one of the side walls of the box is cut away as at 36 to allow large foreign substances to pass out of the box. The portion of wire mesh screens disposed to the left of partition 35 in Figure 7 is subjected to a suction draft which is produced by fan 38, whose intake extends in close proximity to the lower side of the wire screen 22, said fan having a drive shaft 39 upon which a pulley 40 is fixedly secured. This pulley 40 has a belt 41 mounted thereon which belt also is mounted upon another pulley 42 (see Figure 1) on a drive shaft 43. The suction draft from fan 38 will remove dust and many other loose impurities from the grain, which cannot be removed by the reciprocating screen.

The lower end of screen box 20 has leading therefrom a suitable flexible hose connection 45 which leads to the lower portion of an elevator 46. This elevator is typical of several elevators used in this invention. A roller 47 is rotatably mounted in the lower end of the elevator as at 48, said roller having a suitable belt 49 disposed thereon. Belt 49 is also mounted around a second pulley 50 in the upper portion of the elevator (see Figure 1) and has suitable cups 51 located thereon at spaced intervals which are adapted to collect the grain as it is deposited in the lower portion of the elevator and carry it upwardly. The pulley 50 is fixedly secured on shaft 52, said shaft being rotatably mounted in the elevator 46, as well as in other identical elevators whose functions will be presently described.

The shaft 52 has a pulley 53 on the end thereof upon which a belt 54 is mounted, and this belt extends downwardly and is mounted on a second pulley 55 on shaft 56. The shaft 56 is rotatably mounted in uprights 57, which in turn are pivoted as at 58 to brackets 59 (Figures 1 and 7).

In order to hold each of the uprights 57 in the proper position, a suitable adjustable link 60 is provided which has one end thereof pivotally engaging the intermediate portion of the upright, and its other end pivotally secured to the bracket 59. The overall length of link 60 may be changed to vary the position of the shaft 56 and the pulleys thereon, and thereby effect an adjustment in the tautness of the belts. The shaft 56 has another pulley 61 fixedly secured thereon upon which a belt 62 is mounted. The belt 62 is also mounted upon another pulley 63 which is fixedly secured on drive shaft 43. It is seen that the elevators receive their power from the drive shaft 43 through the members 53, 54, 55, 56, 61 and 62.

After the cereal grain has been elevated to the upper portion of elevator 46 (see Figure 2) it is deposited into the pipe or chute 65, which conveys the grain to scouring and scarifying device 66 (Figures 3 and 5).

The function of this scouring and scarifying device is to loosen the foreign substances which have adhered to the grains and thus facilitate the removal of these substances so that when the grain is finally ground, only the desired elements will be present. This will also remove the root or husk end 15 of the grain (Figure 12). This device is supported by a cross member 69 which is disposed between elevators 70 and 71.

By referring to Figure 5, it will be seen that the outer casing 73 is secured to the cross member 69 by any suitable means such as bolts 74. Disposed on the interior wall of the outer casing is a serrated plate 75 against which the grain is thrown in order to scarify the exterior surface thereof to assist in removing the impurities as well as portion 15. Secured within the serrated plate 75 and concentric with the casing 73 is a fixed inverted frustrated conical member 76 which has a hole 77 in alignment with another hole 78 which is cut in the cross member 69 disposed thereabove. The exterior of the member 76 has a plurality of projections 80 disposed thereon which are adapted to cooperate with a second set of projections 81, disposed upon the interior of inverted hollow conical member 82. This member 82 is fixedly secured on the upper portion of a shaft 83 which has its intermediate portion rotatably mounted in bearing 84, and its lower end supported by a thrust bearing 85. It will be noted that as the shaft 83 turns that the grain, which is introduced into the holes 78 and 77 from the spout 65, will pass between the conical members 76 and 82 and the surfaces of the grains will be roughened and scarified by means of the projections 80 and 81 and serrated plate 75.

Means have also been provided whereby the distance between the projections 80 and 81 may be varied. This adjustment is effected by a pair of vertically disposed rods 86 which have their lower ends penetrating a cross member 87, said cross member being adapted to support the thrust bearing 85 and the shaft 83. The upper end of the rods 86 penetrate supporting member 69 and have suitable nuts 86a threadedly secured on the upper end thereof. By turning the nuts 86a the distance between points 80 and 81 may be varied. It should be further noted that the cross member 87 which supports the shaft 83 and the thrust bearing 85, has its ends slidably secured in suitable guideways 90, said guideways being secured to the proximate faces of elevators 70 and 71.

In order that rotation may be imparted to the shaft 83 and its associated parts, a suitable pulley 95 has been fixedly secured near the lower end of said shaft (see Figure 3). Upon this pulley a belt 96 is mounted which belt also is mounted upon a pulley 97 which is fixedly secured on a center mill shaft 98 (Figures 3 and 4). When this rotative movement is imparted to the shaft 83 and conical member 82, the centrifugal force will cause the grains which are introduced into the opening 77 to move radially of the shaft and to be thrown against the interior of the roughened plates 75. These grains will then fall downwardly onto a suitable housing 99 which is secured to the lower portion of the casing 73. A chute 105 leads from housing 99 and is connected to the lower portion of elevator 70, which elevator is identical in all respects to the elevator 46. From the lower portion of this elevator, the grain is conducted upwardly (see Figure 8) and is delivered to a spout 107, the lower end of which communicates with the first mill 109. The spout 107 has a suitable throttle 110 disposed therein which may be regulated in order to direct any surplus amount of grain back into the hopper 19 through spout 111. The position of this throttle is regulated by means of a suitable crank 112, disposed on the outside of the spout 107.

By observing Figure 8, it will be seen that the spout 105 has its intermediate portion connected to a suction fan 115, which fan has a drive shaft 116 upon which pulley 117 is mounted. A belt 118 is mounted on this pulley and also upon another pulley 119, said pulley 119 being fixedly secured around shaft 83.

As the shaft 83 rotates, it is evident that the fan shaft 116 will be rotated to cause a suction draft to be applied to the scarified grain as it passes downwardly through the spout 105. This draft will further remove the loosened impurities such as dust, dirt, portion 15, and the like from the grain. After this suction draft is applied the elements of the grain which are left are in condition for grinding by the various mills, which will be subsequently described.

The mill 109 is mounted on top of supporting framework 120. This mill comprises an outer casing 121 which has cored holes 122 in its periphery and bottom portion thereof (Figures 2, 2A and 4). Disposed within this casing is a second casing 123, the outer periphery of which is spaced a slight distance from the inner walls of casing 121 in order to allow circulation of air therebetween. The casing 123 is adapted to surround the lower grinding rock 124, said rock being fixedly mounted on the upper portion of shaft 125. This rock has a band 126 mounted therearound upon which is secured a pair of spirally disposed vanes 127, said band and vanes being adapted to rotate along with the grinding rock 124 and draw air downwardly into the casing through openings 129.

The upper face of the rock 124 is properly furrowed to form a grinding surface so that the grain will be properly cracked and ground (see Figure 10). This upper surface of the rock 124 is disposed near the lower surface of stationary top grinding rock 130, which is fixedly secured in the upper housing 131, said housing being adapted to rest upon the lower casing 121; likewise the bottom surface of rock 130 is notched and furrowed in the same manner as the upper surface of bottom rock 124. A suitable hole 130a is provided in the center of the stationary rock 130 so that the grain may be introduced from the spout 107 and onto the top of the rotary grinding rock 124, after which the grain will be crushed between the rocks as the lowermost rock rotates. The furrows in the proximate faces of stones 124 and 130 are identical and cut in the manner shown in Figure 10, but when the top stone is superimposed upon stone 124, the acute edges 132a will shoulder against each other (Figure 4). The furrows 132 are much deeper near the center than at the circumference, but the uppermost cutting edges 132a are in the same plane. These furrows are not radially disposed but cut in sections, each furrow being disposed at an acute angle to the radius of the stone. By so grinding the faces of the stones, any hard metallic substance which might accidentally get into the mill will be sheared and pulverized without damage to the stones; consequently the bridge tree 138 can be rigidly adjusted and the lower stone mounted in a non-yielding position.

When the grain is properly ground it is thrown to the exterior of the rock 124 where it falls downwardly into the casing 123 and is expelled therefrom through opening 134 into the spout 135 and onto reciprocating sifter or belt 136. Special attention is called to the function that the spirally disposed vanes 127 perform. When the grain has been ground, it necessarily follows that a great deal of heat is generated. This heat along with the inherent moisture within the grain will create a humidity or a steam which, if not removed therefrom, will cause the ground grain to become soggy, and thereby decrease its qualities. By providing the vanes 127, air is drawn down through the openings 129 and the proper ventilation is provided.

In order to vary the distance between the proximate faces between the grinding rocks 124 and 130, a suitable bridge 138 has been provided at the lower end of the shaft 125, said bridge being adapted to be mounted for vertical sliding movement in the lower portion of framework 120 (Figures 4 and 6). This bridge is supported by a a pair of vertically disposed rods 139 which project upwardly and have their upper ends normally penetrating a second bridge 140, disposed across the upper portion of casing 131.

When it is desired to raise or lower the rock 124 and its associated shaft 125, the nuts or hand wheel 139a on the upper portion of rods 139 are turned to vary the effective length of the rods and consequently the bridge 138 and shaft 125 are raised or lowered. The distance between the rocks 124 and 130 within mill 109 must be such that the grains will be only subjected to the light grinding, that is, a sufficient grinding to separate the powdered portion 11 from the grain without injuring the globules therein. When this grinding is effected, the entire ground mass will be expelled through spout 135 and onto the screen 145 of the reciprocating sifter or bolt 136. This screen is of such a mesh that the powdered portion 11 will be allowed to pass therethrough but the other portions of the grain will be retained. The powdered portion after passing through the screen, will fall into box 146 disposed therebelow, whereas the portions of the grain retained upon the screen will gradually move downwardly to outlet 147 and then into the spout 148 which leads to the bottom of elevator 71.

From the lower portion of the elevator 71 the mass of cracked grain which is retained on the screen 145 will be elevated and then delivered to spout 150, said spout leading to the upper portion of the second mill 151. This mill is identical in construction to the mill 109 previously described except that its parts are somewhat larger. Therefore, like reference characters will be given to similar parts and another description will not be made.

Prior to the cracked grain reaching the mill 151, however, it is subjected to another suction draft which removes additional impurities and root portions 15 of the grain which may have not been removed. This suction draft is created by the fan 115, heretofore described, which also effects a suction upon spout 150. This fan 115 has a duct 152 connected thereto said duct also being connected to the intermediate portion of spout 150.

The lowermost rock 124 of the mill 151 is driven by a vertically disposed shaft 98 which has its lower end supported by another bridged tree 138 similar to the one previously described. The rocks 124 and 130 of the mill 151 are so spaced apart from each other that the tough oily portion 12 of the grain will be properly ground. When so ground it is expelled through the opening 154 and into the spout 155 from whence it is delivered to screen 156 of reciprocating sifter or bolt 136.

The screen 156 is of such a mesh that the oily portions 12, after they have been ground, will be allowed to pass therethrough and fall into the box 146 dipsosed therebelow, whereas, the remaining portion, comprising the hard flinty substance 13, and the skin or hull 14 will be retained on this screen. As the screen continues to reciprocate these retained portions will be delivered to trough 157 from whence it passes into the lower portion of elevator 158 through flexible hose connection 159.

The elevator 158 will elevate this portion of the grain and deliver it to the spout 160 which is disposed directly above the third mill 161, which is also similar to the mills 109 and 151 just described, except that its parts are made substantially larger than either.

This mill will grind the hard flinty portions 13 of the grain and the hull or skin 14. When so ground the mass will be expelled through opening 162 and into spout 163 (Figures 2A and 4) from whence it will be delivered to screen 164 of oscillating or reciprocating sifter or bolt 165. Most of the mass will pass through mesh 164 and into the box 146 disposed therebelow, but there is usually some portions which have not been sufficiently ground and these portions will pass downwardly over screen 166. This screen is much coarser than the screen 164 and will allow most of the coarser elements of the grain to fall through. After passing through the screen mesh 166, it is delievered to a flexible spout 167 into the lower portion of elevator 168. This elevator has a pair of pulleys 169 and 170 rotatably mounted therein upon which a belt 171 is mounted, the belt 171 having a plurality of spaced cups 173 secured thereto, which collect the mass from the lower portion of the elevator 168 and deliver it again into the mill 161 through a spout 175.

The lowermost pulley 169 has its shaft 176 extending therefrom upon which is also mounted a pulley 177 (see Figures 1 and 2A). This pulley has a belt 178 mounted thereon which is also adapted to be mounted in the pulley 179 of mill shaft 180 (Figure 4). By so returning the bran and the elements of the grain which have not been properly ground the first time within the mill 161 another opportunity is given the mill to perfect this grinding and consequently, very little, if any, of this same material will fail to pass through the wire mesh 164 on its second trip.

If certain particles are too large to pass through the coarse mesh 166, it is allowed to pass out of the lowermost open end of the sifter 165. Such particles are generally of such a quality that render them unfit for use as a meal.

By referring to Figure 4, it is seen the manner in which the mills may be connected together, so that they will be driven in unison. The power necessary to drive the mills is first delivered to a pulley 185 which is fixedly secured on one end of a shaft 186, said shaft being rotatably mounted in bearing 187. The other end of the shaft 186 has a beveled gear 188 secured thereon which meshes with a beveled gear 189 which is mounted upon the shaft 180 for vertical sliding movement. For this purpose, a suitable keyway 190 is provided in the shaft 180. For example, when it is desired to vary the distance between the rocks within the mill 161, it is necessary to move the shaft 180 up or down relative to the framework 120; consequently, there must be a sliding connection between the shaft 180 and the relatively stationary beveled gear 189.

In order that this vertical movement of the shaft 180 and its associated bridge 138 on the lower end thereof will be allowed, it is necessary to splice the vertically disposed adjusting rod on the right-hand side of the mill (Figure 4) so that this rod may be moved vertically without any part thereof contacting the stationary bearing 187. This rod has been divided into sections 139b and 139c which are connected together at the bearing 187 by means of a suitable loop 139d encircling said bearing. This will allow the necessary adjustment to be made without interfering with the bearing 187.

The lower portion of the shaft 180 has suitable pulley 192 secured thereon upon which belts 193 are mounted. These belts are also mounted upon another pulley 194 on the lower portion of center mill shaft 98. The shaft 98 has a pulley 195 fixedly secured thereon upon which a belt 196 is mounted, and this belt is also mounted upon the pulley 197 on the mill shaft 125. It is seen that as the pulley 185 is rotated, that a rotary motion will be imparted to mill shafts 180, 98 and 125 to cause the mills to be operated in unison.

Also fixedly secured on the center mill shaft 98 is a pulley 200 upon which belt 201 is mounted and this belt is adapted to be mounted on a second pulley 202 on vertically disposed shaft 203 (Figures 1, 4 and 7). The shaft 203 has a pulley 205 fixedly secured thereon upon which belt 206 is mounted, which belt is also mounted upon pulley 207. This pulley is fixedly secured to vertically disposed shaft 27. The pulley 207 imparts rotation to the shaft 27 and thereby causes the eccentric 26 to rotate resulting in the screen box 20 reciprocating.

The shaft 203 has another pulley 210 fixedly secured thereon upon which belt 211 is mounted. This belt is mounted on another pulley 212 fixedly secured on drive shaft 43 (see Figures 1, 2 and 7). The drive shaft 43 has a pulley 215 fixed thereon, upon which belt 216 is mounted. This belt extends upwardly and has a quarter turn therein, and the upper end thereof is mounted upon pulley 217. The pulley 217 is fixedly secured on eccentric shaft 218 mounted in bearing 219, and fixedly secured on this shaft are eccentrics 220 and 221 (Figures 1, 2 and 7) around which one end of rods 223 and 224 respectively is mounted. These rods have their other ends connected to sifters or bolts 136 and 165, respectively. It is seen, that as the shaft 218 rotates reciprocatory motion is imparted to these sifters.

The sifters 136 and 165 are supported by suitable flexible upright bars or flats 225 (see Figures 1, 2A and 9) which extend downwardly and are secured to the framework.

It will be noted by referring to Figures 2, 2A, 8 and 9 that the box 146 into which the ground grain is sifted has a suitable worm conveyor 230 rotatably mounted therein. The end of this conveyor (see Figure 2) has a suitable pulley 231 disposed thereon and on the outside of the box upon which a belt 232 is mounted, said belt extending downwardly and being also mounted on another pulley 233 on drive shaft 43. When the mill is in operation, the worm conveyor 230 constantly rotates and draws the meal or ground grain to the left hand end of the conveyor and at this point it is delivered into the lower end of a delivery elevator 235 (Figures 7 and 8).

Elevator 235 has pulleys 236 and 237 rotatably mounted therein upon which a belt 238 travels. This belt has suitable cups 239 fixed thereon at spaced intervals which collect the meal from the lower portion of the elevator 235 and conduct it to delivery spout 240. The delivery elevator is driven by pulley 241 which is mounted on the drive shaft 43, said pulley having a belt 242 mounted thereon. The belt 242 is also mounted upon pulley 243 which is fixedly mounted upon a shaft 244, extending from the lower portion of the conveyor 235 and upon which the roller 236 is fixedly mounted.

It is therefore seen that I have provided an apparatus which subjects the shelled grain to an initial suction draft which cleans the loose particles therefrom, a scouring device which loosens the foreign matter which has adhered to the grain and then grinds each element of the grain directly in proportion to its toughness and hardness.

Throughout the specification I have described the operation of the mill in connection with the grinding of corn. It is evident that the mill can be effectively used in the grinding of other cereal grains whose characteristics lend themselves to the processing of which this mill is capable. In wheat, for example, there is a husk, a heart, a powdery portion and a small amount of flinty portion. It is therefore evident that by minor adjustments the mill can be used for the processing of wheat, hulled oats, and in fact any type of grain whose characteristics lend themselves to processing in a manner similar to the processing of corn.

The mills are of progressively larger size for the reason that the harder portions of the grains require a heavier mill, the size of the mill being proportioned to the hardness of the portion of the grain being ground.

In the drawings and specification, there has been set forth a preferred embodiment of the invention, and although specific terms are employed, they are used in a generic and descriptive sense only, and not for the purposes of limitation, the scope of the invention being set forth in the appended claim.

I claim:

Apparatus for grinding grain comprising three mills, a screen bottom trough disposed below two of the mills and being adapted to receive the ground particles from the first two mills, a second screen bottomed member disposed below the third mill and being adapted to receive the products of grinding from the third mill, means for imparting vibratory motion to the screen bottomed members, a horizontally disposed trough disposed below the two screen bottomed members and having a screw conveyor therein for propelling the meal falling through the screen bottomed members in a direction towards the first mill, the screen bottomed members sloping in a direction opposite to the travel of the meal in the trough having the screw conveyor therein, whereby the meal from the three mills will be thoroughly mixed, a trough discharging the ground particles from the first mill into the upper end of the first screen bottomed member, the first screen bottomed member having an open pocket separating the screen into fore and aft portions, a pipe leading from the pocket, a conveyor communicating with the pipe for conveying the coarser particles falling into said pocket to the second mill, a pipe and conveyor communicating with the lower end of the first screen bottomed member for conveying the products of grinding from the second mill to the third mill, a spout leading from the third mill for discharging its grindings into the upper end of the second screen bottomed member, the lower end of the second screen bottomed member having a pocket therein covered with a screen coarser than that covering the other portions of the bottom for collecting the products of grinding passing through the coarser screen, a conveyor having communication with the last-named pocket for conveying the particles falling therein into the third mill, the lower end of the second screen bottomed member having an open end whereby the coarser particles which do not pass through the coarser screen are discharged from the second screen bottomed member and are not passed back into any of the mills.

RABRON T. GENTRY.